United States Patent [19]

Suzuki et al.

[11] Patent Number: 5,598,150
[45] Date of Patent: Jan. 28, 1997

[54] POLLING COMMUNICATION SYSTEM

[75] Inventors: Noriyuki Suzuki, Tokyo; Kazutoshi Shimada, Yokosuka; Eisaku Tatsumi, Yokohama; Shinichi Sunakawa, Kawasaki; Katsuhiko Nagasaki, Ichikawa, all of Japan

[73] Assignee: Canon Kabushiki Kaisha, Tokyo, Japan

[21] Appl. No.: 68,192

[22] Filed: May 28, 1993

[30] Foreign Application Priority Data

Jun. 1, 1992 [JP] Japan ................................ 4-165329
Apr. 23, 1993 [JP] Japan ................................ 5-120594

[51] Int. Cl.⁶ .................................................. H04Q 1/00
[52] U.S. Cl. .............................. 340/825.07; 340/825.52; 340/825.08
[58] Field of Search ................ 340/825.52, 825.07, 340/825.08, 825.5

[56] References Cited

U.S. PATENT DOCUMENTS

| | | | |
|---|---|---|---|
| 4,680,583 | 7/1987 | Grover | 340/825.52 |
| 4,896,151 | 1/1990 | Kuranami | 340/825.52 |
| 5,150,114 | 9/1992 | Johansson | 340/825.52 |
| 5,204,669 | 4/1993 | Dorfe | 340/825.52 |
| 5,250,942 | 10/1993 | Nakayama | 340/825.52 |

*Primary Examiner*—Brian Zimmerman
*Attorney, Agent, or Firm*—Fitzpatrick, Cella, Harper & Scinto

[57] ABSTRACT

A parent node transmits a third specific message to child nodes as a broadcast message if a first specific message indicating the start of the child node collides with another message so that normal receiving cannot be performed. Then, the parent node sequentially transmits second specific messages to each child node and then receives responses to recognize the states of the children nodes. The parent node transmits a specific message indicating a realization of a sleeping state as a broadcast message to the children nodes, followed by transmitting a specific message when data to be transmitted from the child node has been generated. The parent node cancels the sleeping state when it receives the specific message.

34 Claims, 11 Drawing Sheets

POLLING COMMUNICATION SYSTEM

BACKGROUND OF THE INVENTION

1. Field of the Invention

The present invention relates to a communication system of a type controlled by polling/selecting.

2. Related Art

Hitherto, data communication systems of information equipment have been characterized as contention systems and polling/selecting systems.

Although the contention system exhibits excellent system extensionability, it must obtain a right to transmit and must perform recovery when communications collide with each other, resulting in a necessity of including complicated hardware and protocol. Even more detrimental, the contention system suffers from a problem that data to be communicated is missed at the time of the collision which deteriorates transmission efficiency.

On the other hand, the polling/selecting system is arranged that its communication flows are concentrically controlled by a control node (a parent node). Therefore, the complicated processes for obtaining the right of communication and the recovery at the time of the collision need not be performed. As a result, it can be realized by relatively simple hardware and protocol.

In the polling/selecting system, the parent node must know the elements (the number of child nodes and the address of each node) of the communication system. Hitherto, the foregoing setting of the elements has been made by an input performed by a user or it has been automatically discriminated by periodic transmission/receipt of a specific message by the parent node.

However, the foregoing conventional technology encounters the following problems when the elements of the communication system are changed, in particular when elements are additionally provided.

First, the user must again input the setting whenever the change has been made in the case where the elements are inputted by the user.

In the case where the parent node automatically discriminates the elements in such a manner that the setting of the elements is automatically made by periodically transmitting/receiving the specific message, the communication traffic accordingly increases, resulting in deterioration in the actual transmission efficiency. In particular, if the periodical intervals are shortened to correspond to the change in the structure, the transmission efficiency deteriorates proportionally. Therefore, the transmissible band range cannot be used effectively.

Another structure may be employed in which the parent node transmits/receives the specific message only when the system is started up. Although the foregoing method is able to prevent the deterioration in the actual transmission efficiency, another problem arises in that the system must be again started up whenever the change is performed.

In the polling/selecting system, the parent node must continue periodic transmission of a message for confirming whether or not data is present at the child nodes in the case where the parent node waits for data supplied from the child nodes. The foregoing case takes place when, for example, a modem is mounted on the child node, and a call from the modem is detected by the parent node followed by performing the ensuing process.

However, the foregoing conventional technology suffers from a problem in that the parent node must continue its operation even if the parent node has no work to be performed except for a work of waiting for data supply from the child node, thus resulting in wasteful consumption of electric power. In the communication system adapted to the polling/selecting system, the parent node cannot be brought into a sleeping state (where the CPU is halted, temporarily stopped, and the main power source is turned off) if there is data to be waited for.

Since the child node is always polled by the parent node, it cannot be brought into the sleeping state although the child node has no data to be transmitted to the parent node.

That is, the overall communication system consumes electric power wastefully.

SUMMARY OF THE INVENTION

It is an object of the present invention to improve a communication system.

It is another object of the present invention to simplify a process to be performed by a parent device to recognize the starting up of a child device.

It is yet another object of the present invention to save electric power consumed by a communication system.

The invention is directed to a communication arrangement in which a parent node transmits a message to plural children nodes and each child node transmits a response message when the specific message is received. The parent node recognizes the state of each child node according to the received response message.

Other and further objects, features and advantages of the invention will be appear more fully from the following description.

DESCRIPTION OF THE PREFERRED EMBODIMENTS

Figure 1:
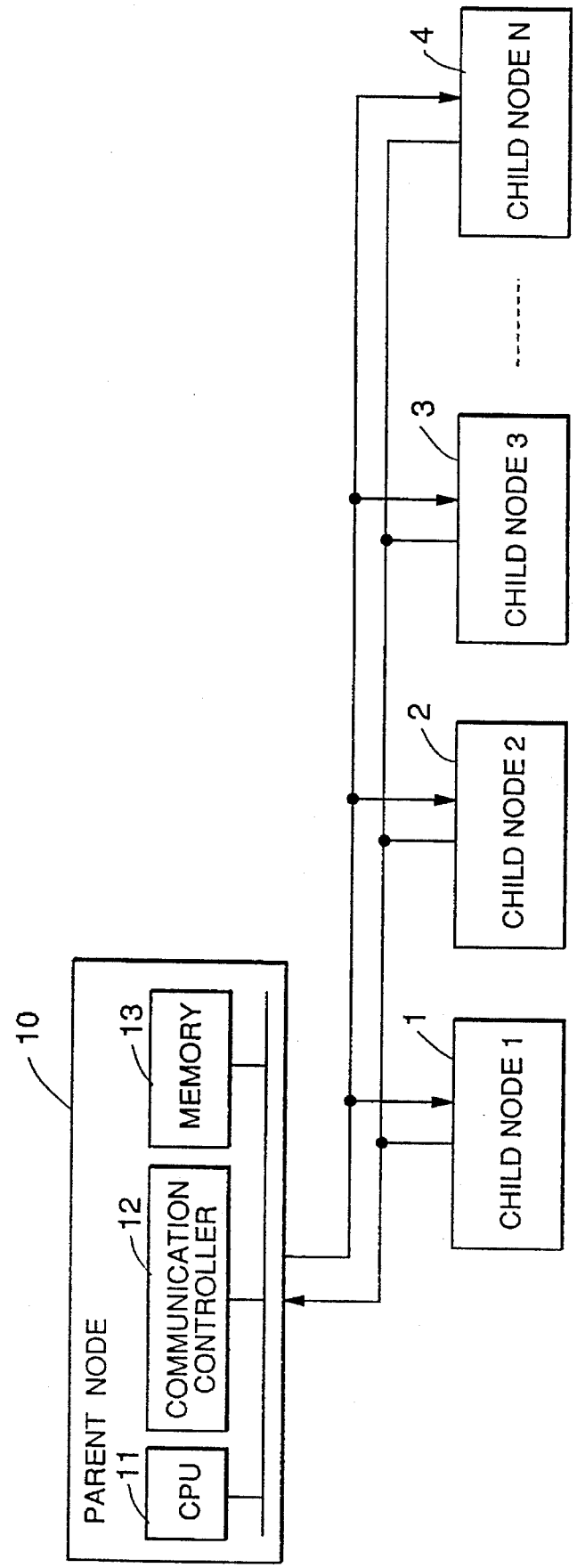
FIG. 1 is a block diagram which illustrates the structure of a system according to an embodiment of the present invention.

FIG. 1 is a block diagram which illustrates a state of connections established in a communication system according to an embodiment of the present invention.

The communication system according to an embodiment of the present invention is constituted by a parent node 10 for controlling a polling/selecting system and children nodes 1 to 4 which can be connected to the parent node by number N or less. The numbers of the children nodes 1 to 4 correspond to the addresses of the children nodes. The address of the parent node 10 may be a proper number except for 1 to N.

The foregoing nodes are connected by a pair of cables that form a bus. Specifically, the output from the parent node is connected to the inputs of all of the children nodes, while the outputs from all of the children nodes are connected to the input of the parent node.

A full duplex communication can be performed between the parent node 10 and an arbitrary child node. This communication is performed by packet communication in units of messages. The message includes data and additional information, such as the address of the subject of the communication, that of the sender, and a check sequence (for example, a CRC code) for inspecting whether or not the communication can be established.

The parent node 10 has a communication controller 12 for controlling the communication, a CPU 11 for processing data and controlling the overall operation, and a memory 13 including a ROM and a RAM. The communication controller follows an instruction issued by the CPU 11 to transmit various messages and analyzes a received message followed by a transmission of results. The RAM included in the parent node 10 stores the state of the children stations. The structure of each of the children nodes 1 to N is similar to that of the parent node 10.

Figure 2:
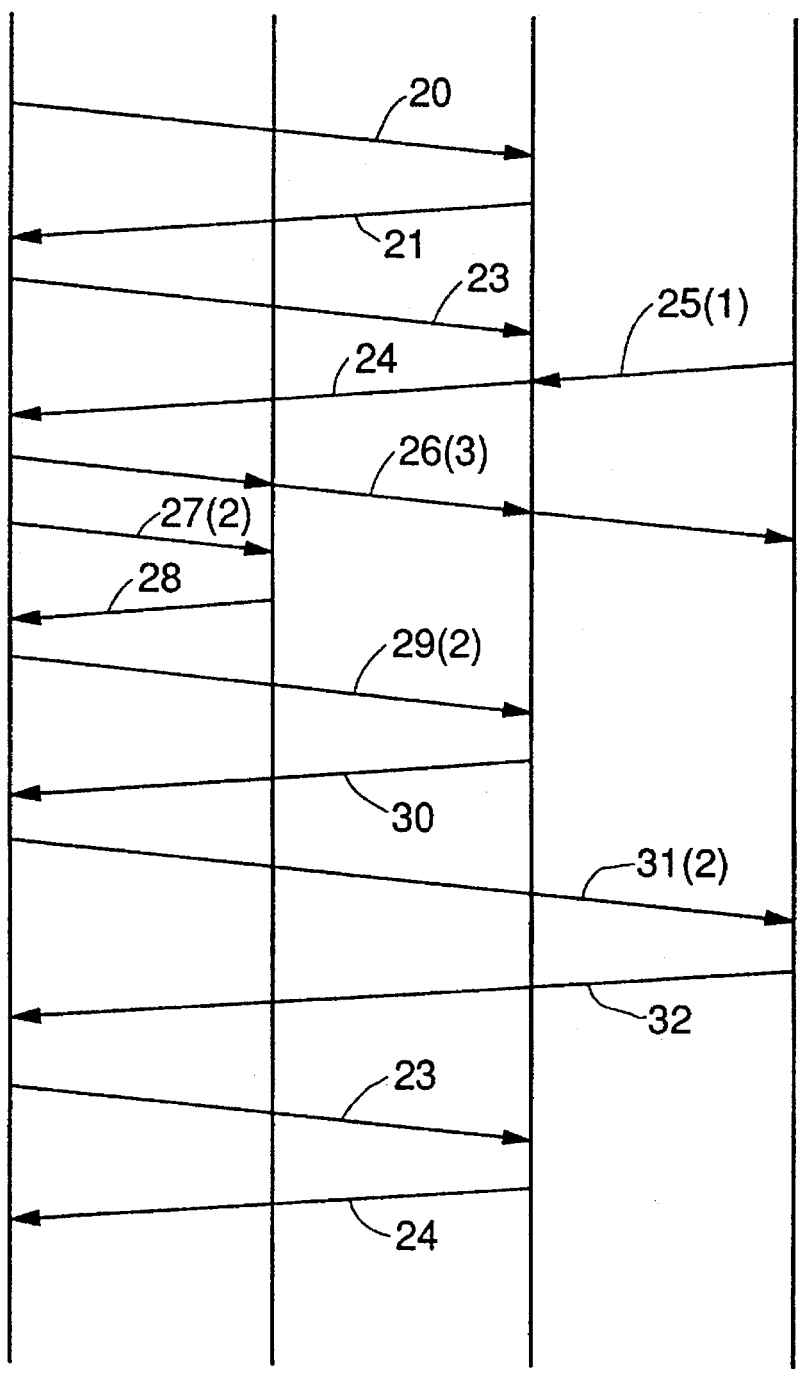
FIG. 2 is a schematic view which illustrates a first state of transmitting/receiving messages between a parent node and children nodes according to a first embodiment of the present invention.

FIG. 2 is a schematic view which illustrates the communication operation according to a first embodiment of the present invention. The description will be made while assuming that the communication system has been started up by the parent node 10 and the children nodes 1 and 2, and the child node 3 is intended to be newly connected.

The parent node 10 and the child node 2 are in the communication state, and the child node 2 returns a response message 21 in response to a command message 20. Since the data transmission could not be completed by transmitting and receiving the message one time, the parent node 10 then issues a command message 23 followed by a return of a response message 24 by the child node 2 in response to the command message 23. Substantially simultaneously, the child node 3 is connected and started up followed by issuing a specific message 25 (1) to notify the parent node that the child node 3 has been newly connected.

Since the parent node 10 receives the response message 24 and the first specific message 25 overlappingly, it receives a broken message resulting in an interrupt. The discrimination whether or not the message is broken can be made depending upon an error in a check sequence in the message.

If the parent node 10 receives the foregoing broken message, it discriminates that the new child node has issued a first specific message. The parent node 10 issues a third specific message 26 (3) in order to notify that it has received the first specific message 25. Since the parent node 10 does not recognize the child node and its number that has been newly connected, the third specific message 26 notifies all of the children nodes in a broadcast message (that is, a multicast address).

The parent node 10 then discriminates the elements of the changed communication system by sequentially issuing second specific messages 27, 29 (2) and 31 (2) as individual messages to the children nodes 1 to N having addresses 1 to N. When the children nodes have received the foregoing messages, they issue corresponding response messages 28, 30 and 32.

The parent node 10 also issues the second specific message to children nodes 4 to N omitted from FIG. 2. If no response message is returned after a predetermined time has passed, the parent node 10 discriminates that the foregoing children nodes are not connected or not operating.

By transmitting/receiving the second specific message and corresponding response messages as described above, whether or not a child node having a certain number is connected can be recognized. If information about the peculiar attribute of the node is added, the parent node 10 is able to recognize them collectively.

As a result of the foregoing sequential operations, the parent node 10 recognizes the elements in the state in which the system has been changed to perform new setting. Then, the parent node 10 restarts the interrupted process. Since the response message 24 has been missed due to the interposition of the first specific message 25 (1) in this case, the process is specifically restarted at the command message 23.

Since the parent node 10 recognizes that the children nodes 1 and 2 have been already connected in the case shown in FIG. 2, the parent node 10 does not need to issue the second specific message to the children nodes 1 and 2. However, it is feasible that the children node 1 or child node 2 is replaced by another device to start up the system so that the first specific message is also issued in this case. Accordingly, the second specific messages are sequentially issued to the children nodes 1 to N.

Although the description in about the case where the first specific message 25 is interposed with another communication, it is to be understood that the process can be simplified if the parent node 10 is not in the communication state and the first specific message 25 can, therefore, be received as it is.

Figure 3:
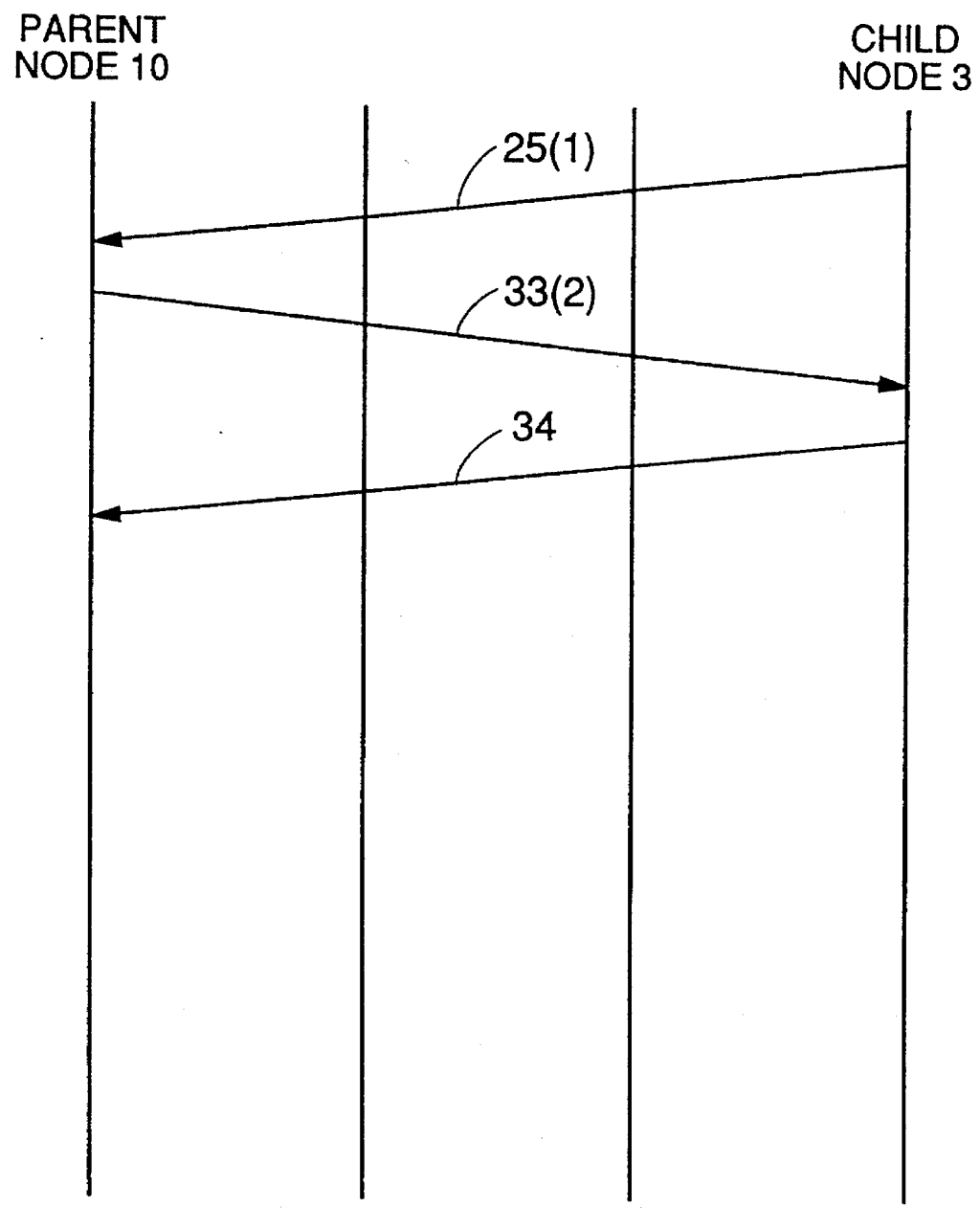
FIG. 3 is a schematic view which illustrates a second state of transmitting/receiving messages between the parent node and the children nodes according to a first embodiment of the present invention.

FIG. 3 is a schematic view which illustrates the communication operation in this case.

If the parent node 10 receives the first specific message 25 from the child node 3, it recognizes that the first specific message 25 (1) is transmitted from the child node 3 in accordance with information of the address of the sender in the first specific message. Then, the parent node 10 issues the second specific message 33 (2) to notify the child node 3 the receipt of the specific message 25.

The response message 34 corresponding to the second specific message 33 does not need to be issued. However, a response is made if the foregoing information about the attribute of the node is simultaneously recognized. Then, the parent node 10 sets a new communication system to which the child node 3 is added.

The operation of the foregoing transmission/receipt of the specific message will now be described with reference to flow charts shown in FIGS. 4 and 5.

Figure 4:
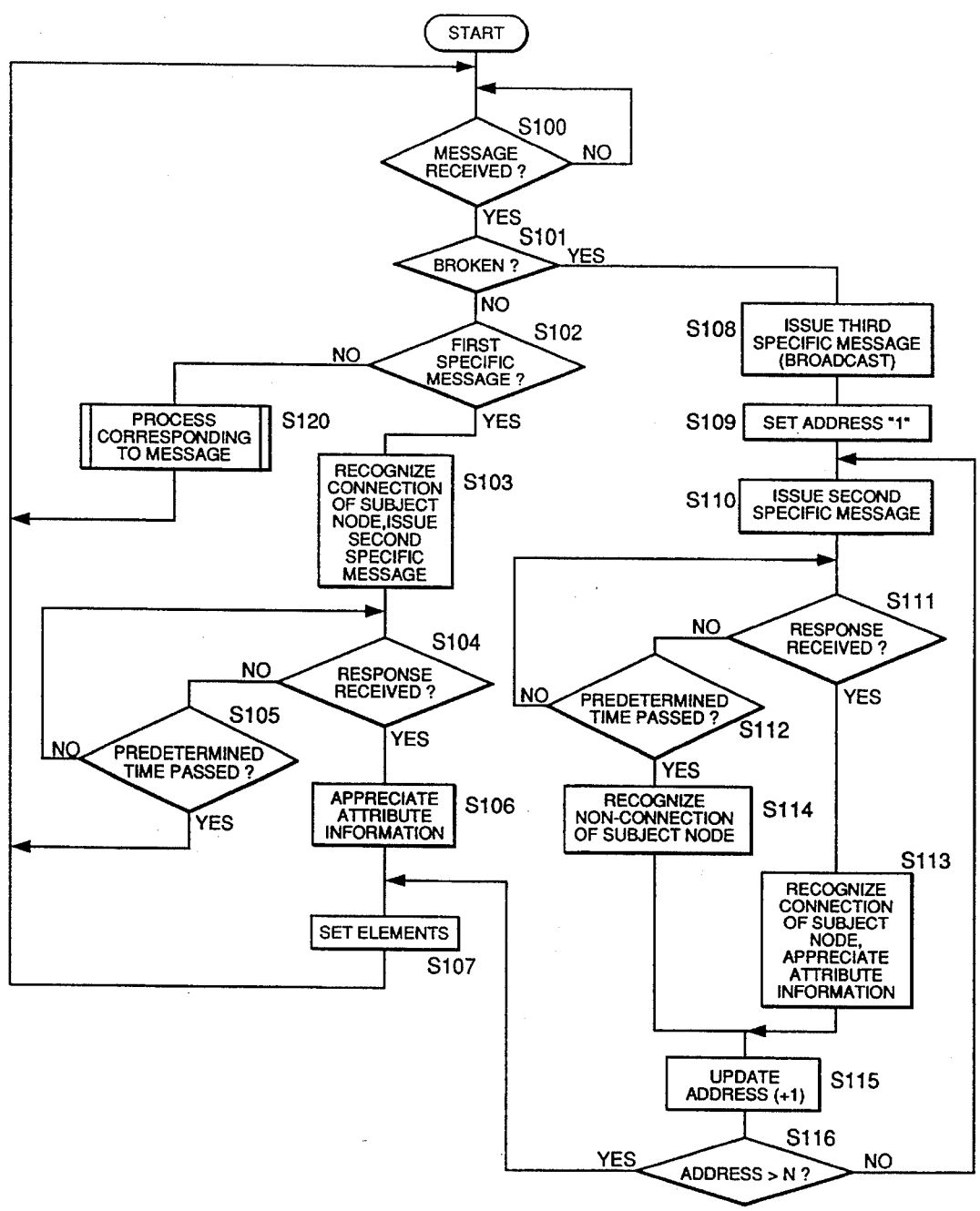
FIG. 4 is a flow chart which illustrates the operation of the parent node according to the first embodiment.

FIG. 4 illustrates the operation of the parent node 10. In step S100, the receipt of the message is awaited. In next step S101, the parent node 10 discriminates whether or not the received message is a broken message. If the received message is a normal message, the parent node 10 discriminates whether or not the received message is the first specific message (S102). If the received message is not the first specific message, the message is a message for an ordinary communication, and, accordingly, the parent node 10 performs a process to correspond to the message in step S120.

If the received message is the first specific message, the parent node 10 detects the newly connected child node and its number from the sender address contained in the received message. The parent node 10 then issues the second specific message to the child node in step S103. The parent node 10 waits for the response message corresponding to the foregoing message for a predetermined time in steps S104 and S105. The parent node 10 recognizes the attribute information of the subject child node from data in the response message in step S106 and then sets a new communication system to which the new node is added in step S107.

If a discrimination is made in step S101 that the received message is a broken message, the parent node 10 issues the third specific message and gives a broadcast address to it (S108). The parent node 10 sets the address to 1 in step S109 and then issues the second specific message in step S110 to the foregoing address. The parent node 10 then waits for the response message corresponding to the second specific message for a predetermined time in steps S111 and S112.

If a reply of the response message is made, the parent node 10 recognizes the connection of the child node having the subject address number and also recognizes the attribute information of the child node in step S113. If no reply of the response message is made in a predetermined time, the parent node 10 recognizes that the child node having the subject address number is not connected in step S114.

The parent node 10 updates the address by +1 in step S115 followed by repeating the operations from S110 in step S116 if the address is not larger than N. That is, the operations from step S110 to S115 are repeated N times. In step S107, the parent node 10 sets the communication system by using the recognized new element.

Figure 5:
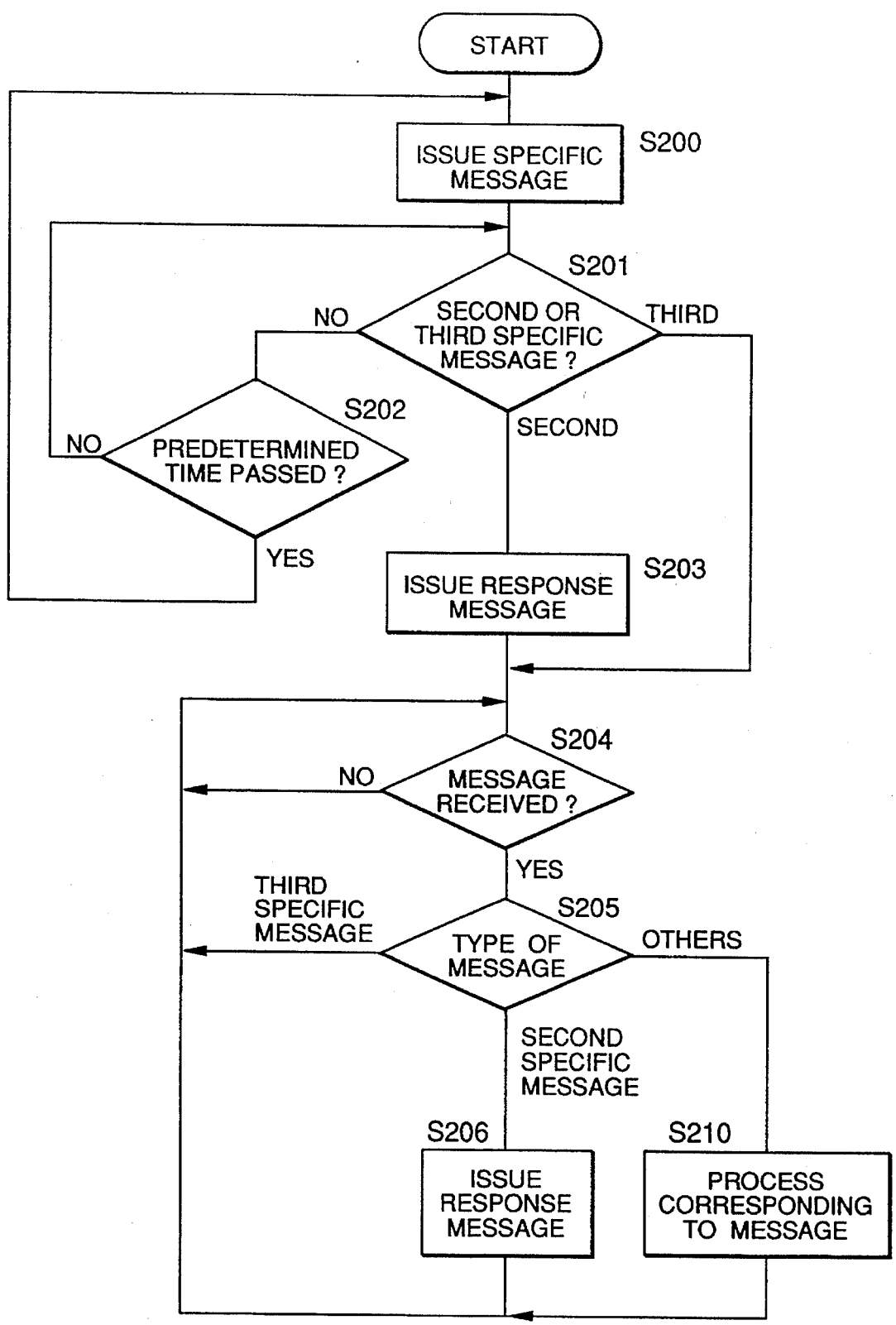
FIG. 5 is a flow chart which illustrates the operation of the children nodes according to the first embodiment.

FIG. 5 illustrates the operation of the children nodes. When the child node is started up, it issues the first specific message to the parent node 10 in step S200. The child node waits for the receipt of the second or the third specific message for a predetermined time in steps S201 and S202. If no message is received within the foregoing time, the flow returns to step S200.

If the message received within the time is the second specific message, the child node issues the response message corresponding to this message in S203 followed by proceeding to step S204. If the message is the third specific message, the flow simply proceeds to step S204.

The child node waits for a receipt of a new message in step S204. If the message is the third specific message in step S205, the child node does not perform any operation and the flow returns to step S204. In this case, the received third specific message is a message that corresponds to a specific message issued by another node. Therefore, it may be ignored.

If the message received in step S204 is the second specific message, the child node issues the response message corresponding to the message in step S206. If the message received in step S204 is another message, the message is a message for an ordinary communication. Therefore, the child node performs a process corresponding to the message in step S210. Then, the operations from step S204 are repeated.

As described above, this embodiment enables the element of the communication system to be automatically set to correspond to a change in the communication system. Furthermore, the sequential operations relating to the setting are performed only when the system is changed. Therefore, the effective communication speed is not substantially lowered.

It should be noted that, when the overall communication system is started up, the parent node is started up finally. As a result, the foregoing sequential operations can be restricted to one to two times.

It might be considered feasible to employ an arrangement in which the main power source for the child node can be turned on/off in response to the message from the parent node.

In this case, all of the children nodes are not omitted from the power supply but at least the circuits relating to the communication are supplied with electric power. When an ON-message is issued from the parent node, the power supply to the other portions is made to again realize a complete operational state. At the time of starting up the system in response to the ON-message, no specific message is issued in a manner different from a manner when the so-called starting up operation is performed (when the system is started up in a completely power off state or when hardware is reset).

If the arrangement is made such that the system can be turned on/off by a remote parent node as described above, the sequential operations are not performed each time the child node is turned on. Therefore, a stable state can immediately be realized. Furthermore, even if the children nodes are disposed in a dispersed manner, the need to switch on the power switches can be eliminated.

Another arrangement may be employed in which the control of the power source similar to that performed when the off message is received can be performed by the switches or the like of the children node portions.

Although the foregoing first embodiment is arranged to use the bus-like communication configuration, the present invention is not limited to this. For example, the present invention may be similarly adapted to another communication topology, such as a star-like communication arrangement or a daisy chain communication arrangement.

The present invention may be adapted to a half-duplex communication arrangement in place of the full-duplex communication arrangement. In this case, the specific message does not reach the parent node during communication performed by the parent node. However, the new node repeats issuing the first specific message until the parent node issues the second or the third specific message as shown in the flow chart shown in FIG. 5. Therefore, the specific message can be reliably (at least in the form of a broken message) supplied to the parent node when the parent node is brought into a receiving state.

When the parent node receives the specific message or the broken message, it immediately issues the second or the third specific message. Although it can be considered that the second or the third specific message interferes with the message issued from the child node which is performing the normal communication, the child node is brought into the receiving state after it has issued the foregoing message.

Therefore, the parent node is again brought into the receiving state after it has issued the second or the third specific message followed by performing the ensuing operations and after it has confirmed that the specific message is not received again (if it is again received, the foregoing operations are repeated). As a result, the handshaking of the parent node and the new node does not go around in circles.

Figure 6:
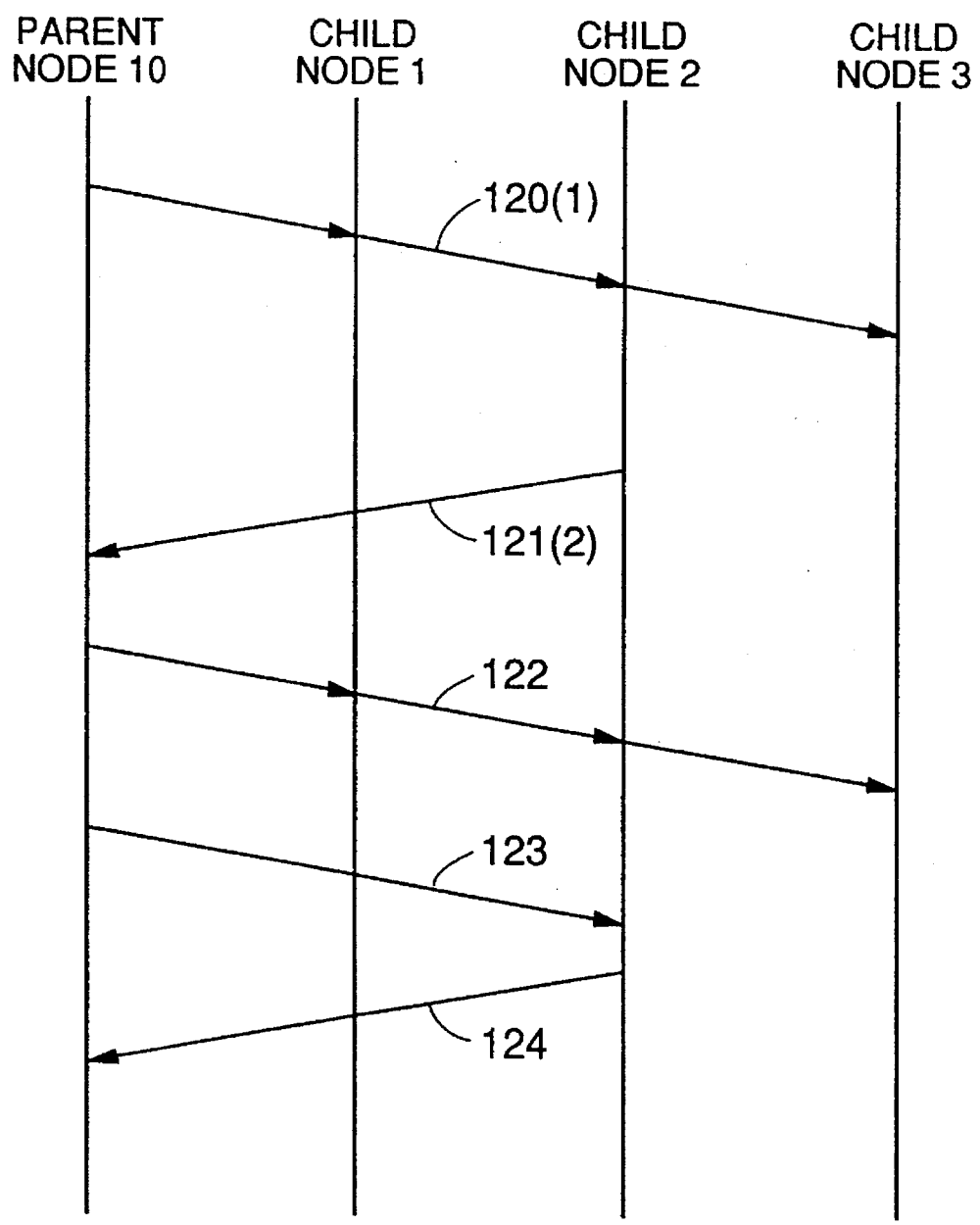
FIG. 6 is a schematic view which illustrates a state where a message is transmitted between the parent node and the children nodes according to a second embodiment of the present invention.

FIG. 6 is a schematic view which illustrates the communication operation according to a second embodiment of the present invention. It should be noted that the block diagram shown in FIG. 1 is employed to show the state of connections in the communication system according to this embodiment. When the parent node 10 has completed its work except for waiting for supply of data from any one of the children nodes, the parent node 10 issues, to the child node, a first specific message 120 in the form of broadcast message (that is, a multi-cast address). The child node receives the first specific message 120 (1), and then it is enabled to issue a message without the polling/selecting operation performed by the parent node 10. The parent node 10 issues the specific message 121 (2), and then it halts, the CPU being brought into a sleep state.

Then, the child node 2 issues a second specific message 121 (2) to the parent node 10 when a phenomenon occurs which necessitates data transmission to the parent node 10 (for example, a call is received by the modem of the facsimile).

The parent node 10, which has detected the sending of the second specific message 121 (2), cancels the halt of the CPU which is restored from the sleeping state. The parent node 10 then issues a response message 122 corresponding to the second specific message 121.

The foregoing response message 122 is used to notify the child node 2 of the receipt of the second specific message 121, while it is used to notify the other children nodes of the completion of a period in which the message can be issued without the polling/selection operation of the parent node 10. Therefore, it is notified in the form of a broadcast message.

The parent node 10 issues the response message 122, and then it is returned to an ordinary operation to issue a command message 123 in order to receive data from the child node 2. The child node 2 issues a response message 124 corresponding to the command message so that data is transmitted to the parent node 10.

The second specific message 121, in the data portion thereof, includes the address of the sender child node and its cause, that is, information about the phenomenon which causes the second specific message 121 to be issued. As a result, the parent node 10 receives the second specific message 121, and then it discriminates the command message and the child node to which the command message is transmitted.

The mechanism of the parent node 10 in halting the CPU and in cancelling the halt will now be described.

Figure 7:
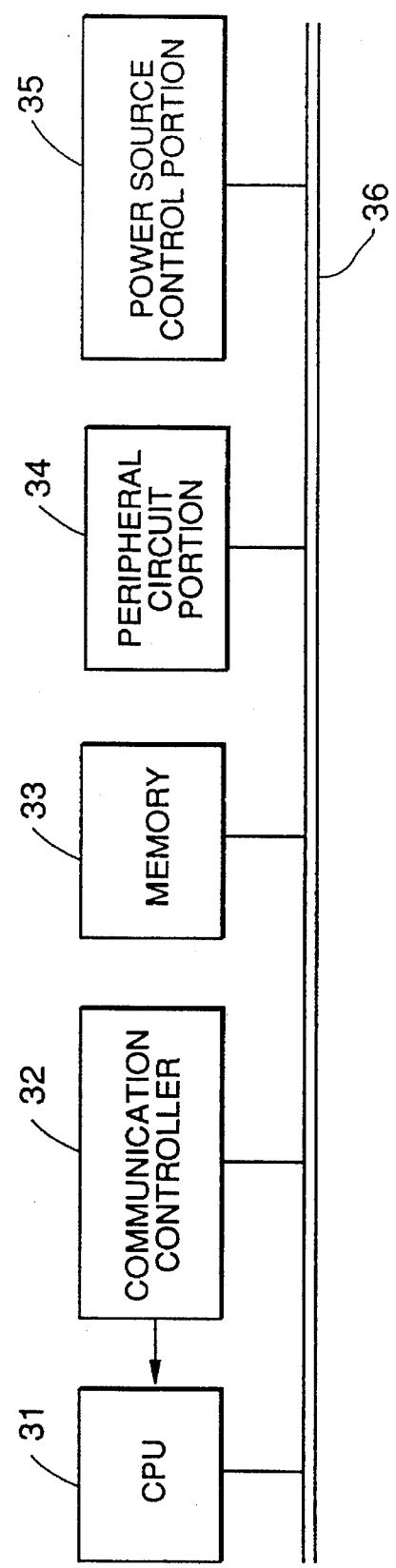
FIG. 7 is a block diagram which illustrates the parent node according to the second embodiment of the present invention.

FIG. 7 is a block diagram which illustrates the parent node 10 according to this embodiment. Referring to FIG. 7, reference numeral 31 represents a CPU comprising a microprocessor and the like and incorporating an interrupt control circuit. Reference numeral 32 represents a communication controller arranged so that it outputs an interrupt demand signal to the CPU 31 when at least received data is present. Reference numeral 33 represents a memory comprising a ROM and a RAM, the ROM storing a program for the CPU 31 and the like. The RAM is used as a working store at the time of the operation of a program. Reference numeral 34 represents a non-specified peripheral circuit, such as a display device, an input device, or a secondary storage device. Although an interrupt demand signal is usually outputted from the foregoing device group to the CPU 31, the group is not a necessary element for this embodiment and therefore its description is omitted here.

Reference numeral 35 represents a power source control portion for controlling the supply of electric power to the peripheral circuit portion 34 in compliance with a command issued from the CPU 31 when the CPU 31 is halted. The electric power is always supplied to the CPU 31, the communication controller 32 and the memory 33. If a microprocessor capable of applying voltage that is lower than the operation voltage at the time of the halt is employed as the CPU 31, a voltage switching control circuit is included in the power source control portion 35. The foregoing elements are connected to each other by a common bus line 36.

In the parent node 10, the CPU 31 controls the power source control portion 35 so that the power supply to the peripheral circuit portion 34 is cut. Then, the CPU 31 instructs the communication controller 32 to issue the first specific message 120. Then, the CPU 31 executes the halt demand so that the operation is halted. The CPU 31 stops its clock at this time, and no data is written on the memory 33. Therefore, only the communication controller 32 is in an operable state and only a small electric power is consumed.

If the second specific message 121 is issued from any one of the children nodes, the communication controller 32 detects the issuance of the second specific message and outputs an interrupt demand signal to the CPU 31. In response to the interrupt demand signal, the CPU 31 cancels the halt. Also the clock starts oscillating, and thus the operation is restarted.

The CPU 31 first executes an interruption process to correspond to the foregoing interrupt demand signal. During this process, the CPU 31 receives the second specific message 121, and instructs the communication controller 32 to issue the response message 122 corresponding to the second specific message. The CPU 31 controls the power source control portion 35 to again supply electric power to the peripheral circuit portion 34. Then, the flow returns to the main process in which the process of issuing the command message 123 and ensuing processes are performed.

Although the case where a single child node issues the second specific message 121 has been described, it may be possible for a plurality of children nodes to issue the second specific messages. In this case, the parent node 10 undesirably receives a broken message and therefore it cannot discriminate which child node that has issued the second specific message.

In order to overcome the foregoing problem, the child node that issued the second specific message repeats issuing the foregoing message until the parent node 10 issues the response message corresponding to the second specific message. In order to prevent continuous interference of the second specific messages issued from a plurality of the children nodes at this time, the time intervals among repetitions are made to be random or a difference time interval is set for each node. That is, the parent node 10 does not issue the response corresponding to the second specific message until it receives the second specific message, while the child node repeatedly issues the second specific message until it receives the response message.

Figure 8:
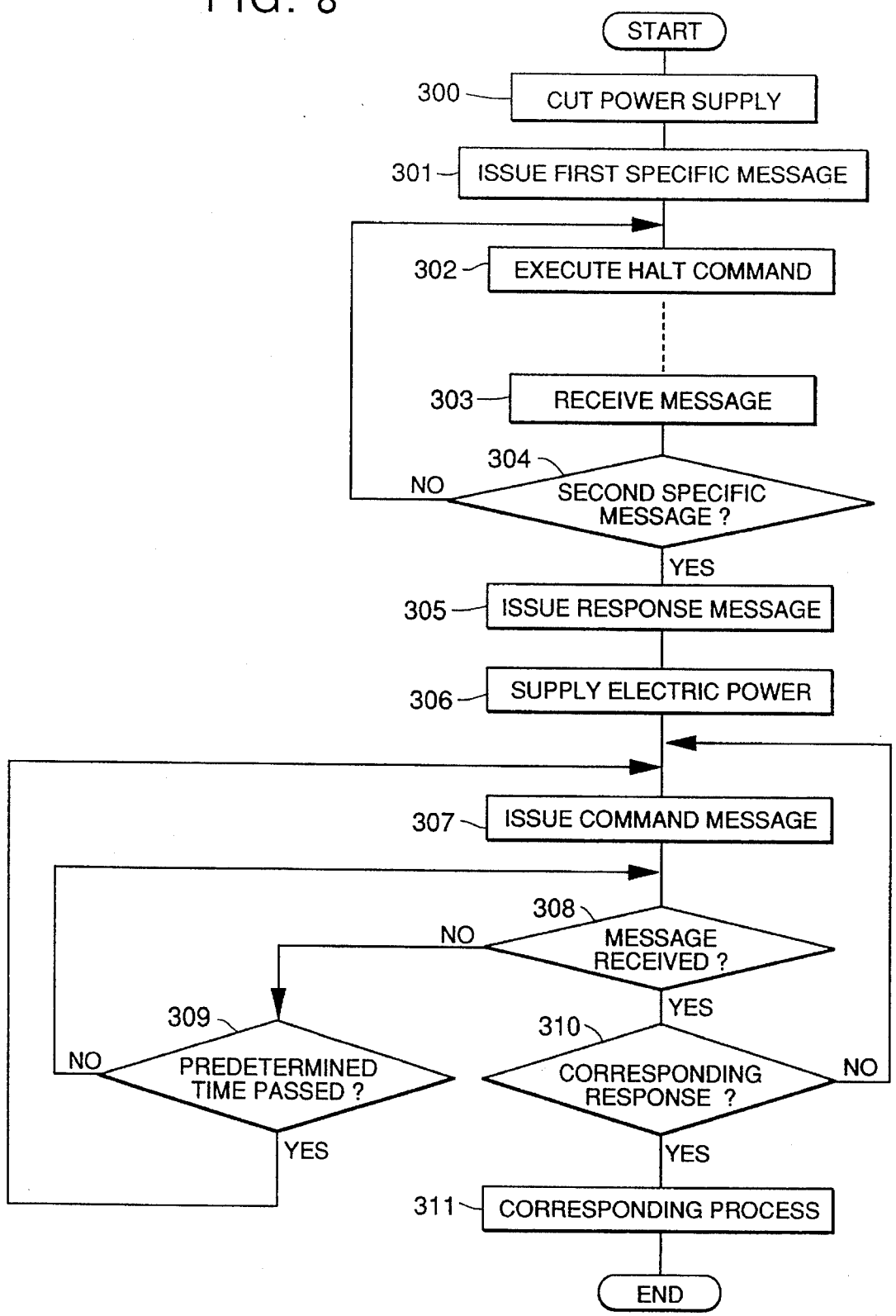
FIG. 8 is a flow chart which illustrates the operation of the parent node according to the second embodiment of the present invention.
Figure 9:
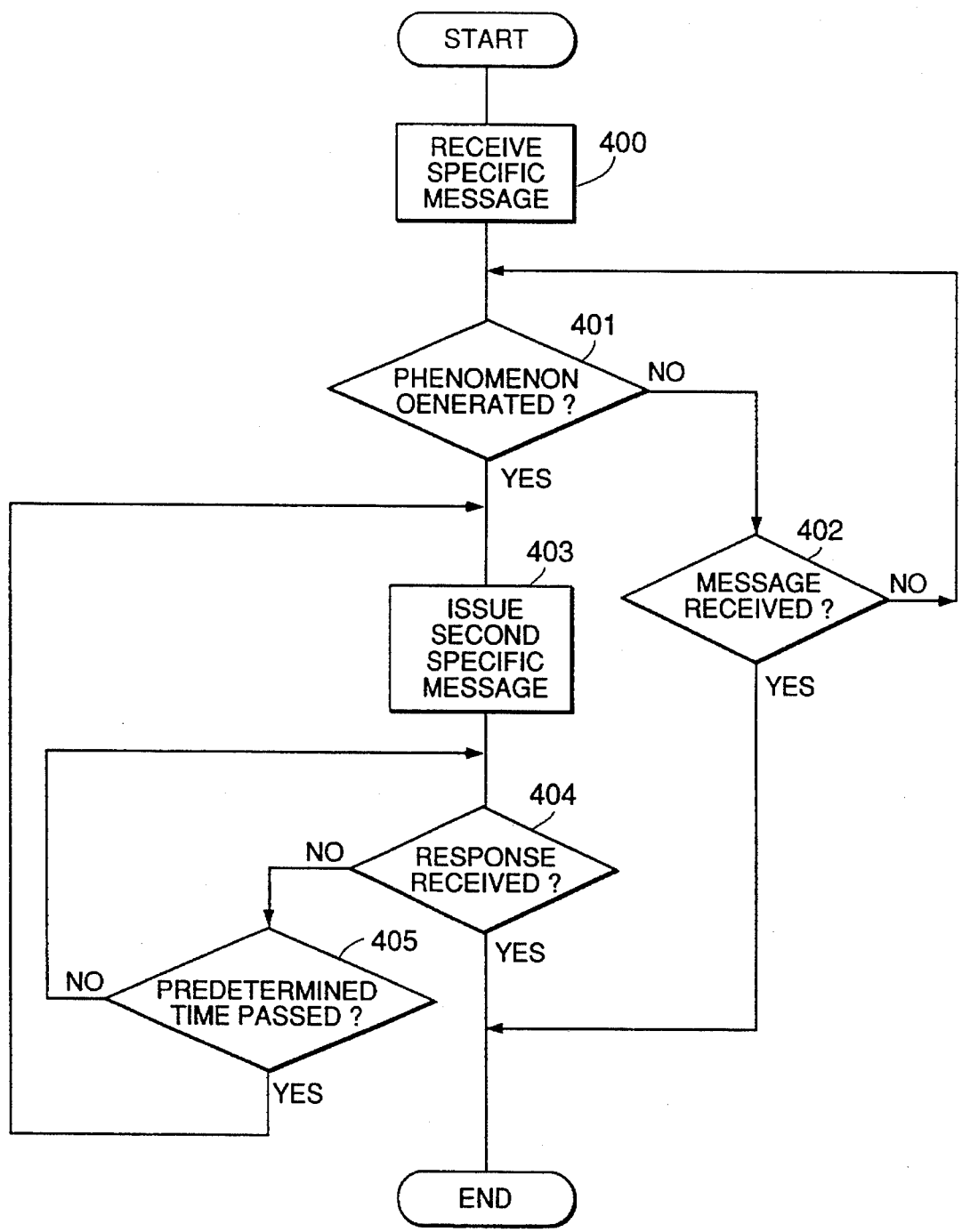
FIG. 9 is a flow chart which illustrates the first operation of the children nodes according to the second embodiment of the present invention.

The foregoing operations for transmitting and receiving the first specific message 120 and the second specific message 121 are expressed as a flow chart as shown in FIGS. 8 and 9.

FIG. 8 is a flow chart which illustrates the operation of the parent node 10. The CPU 31 controls the power source control portion 35 to cut the supply of electric power to the peripheral circuit portion 34 in step 300 and then instructs the communication controller 32 to issue the first specific message 120 in step 301. The CPU 31 executes the halt command in step 302. Then, the CPU 31 halts its operation until the interrupt demand signal is outputted from the communication controller 31. If any one of the children nodes issues the second specific message 121, the halt of the CPU 31 is cancelled and it receives the message in step 303. In step 304, the CPU 31 discriminates whether or not the received message is the second specific message 120. If the message is not the second specific message 120, the halt is undesirably cancelled due to an erroneous cause such as introduction of noise into the communication line or the interrupt demand signal line. Therefore, the flow returns to step 302 in which the CPU 31 again executes the halt command.

If the received message is the second specific message 121, the CPU 31 instructs the communication controller 32 to issue the response message 122 corresponding to the second specific message in step 305. Then, the CPU 31 instructs the power source control portion 35 in step 306 to again supply electric power to the peripheral circuit portion 34. If a portion of the peripheral circuit portion 34 must be initialized, the CPU 31 also performs an initializing process.

The second specific message 121 contains the address of the child node that has issued the second specific message 121 and information of the cause of the message issuance. In accordance with the foregoing information, the CPU 31 instructs the communication controller 32 in step 307 to issue a command message to correspond to the foregoing cause. The CPU 31 then waits for the response message 124 from the child node in step 308. It can be considered that the foregoing command message does not reach the transmission subject node or is erroneously transmitted to the same by an erroneous transmission occurring in the communication line or the like. Accordingly, the CPU 31 discriminates whether or not a predetermined time has passed in step 309. If a predetermined time has not passed, the flow returns to step 308 in which the CPU 31 waits for the response message. If a predetermined time has passed, the flow returns to step 307 in which the CPU 31 again transmits the command message. In step 310, the CPU 31 discriminates whether or not the received response message corresponds to the command message 123 issued in step 307. If it does not correspond to the command message 123, the flow returns to step 307 in which it again transmits the command message. If it corresponds to the command message 123, the CPU 31 executes a corresponding process in step 311. Then, the parent node continues an ordinary operation.

FIG. 9 is a flow chart which illustrates the operation of the child node. In step 400, the first specific message is received and it is discriminating whether or not the phenomenon has taken place (for example, a call is established to the modem for example) in step 401. If the phenomenon does not occur, the receipt of the message is discriminated in step 402. If the message has been received, the parent node has been restored from the sleep state to the ordinary operation state. Therefore, the ordinary operation process is then continued. If the message has not been received, the flow returns to step 401.

If the phenomenon has occurred in step 401, the second specific message 121 is issued in step 403 followed by waiting for the response message corresponding to the second specific message for a predetermined time (or foregoing random time) in steps 404 and 405. If it has not been received, the flow returns to step 403 in which the second specific message 121 is again transmitted. If it has been received, the ordinary operation process is then continued.

As described above, according to this embodiment, the parent node can be brought into the sleep state if the parent node has no task except for waiting for data from the child node while employing a simple method of the polling/selecting system as the communication protocol. Therefore, wasteful electric power consumption can be prevented.

It is also preferable that the child node is brought into the sleep state to reduce electric power consumption. If the parent node has been brought into the sleep state, the child node is freed from the continuous polling operation according to this embodiment. Therefore, the child node can be shifted to the sleep state.

Figure 10:
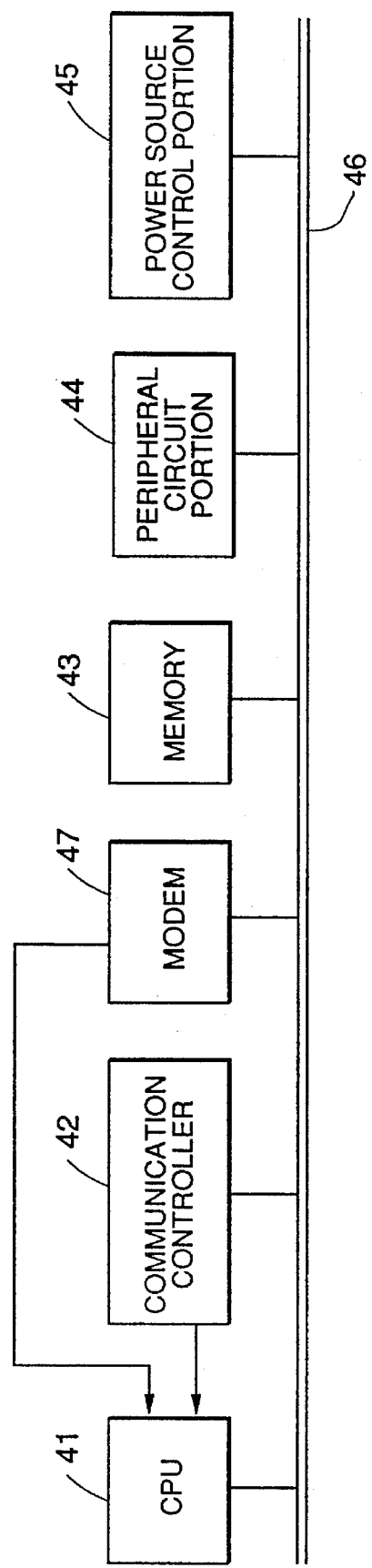
FIG. 10 is a block diagram which illustrates the child node according to the second embodiment of the present invention.

FIG. 10 is a block diagram which illustrates the child node in the foregoing case. Referring to FIG. 10, reference numerals 41, 42, 43, 44, 45 and 46 respectively represent a CPU, a communication controller, a memory, a peripheral circuit, a power source control portion, and a bus line which are similar to those of the child node shown in FIG. 7. Reference numeral 47 represents a modem which transmits/receives data to and from a remote apparatus through a public line (omitted from illustration). The difference from the parent node shown in FIG. 7 is that the interrupt demand signal to be supplied to the CPU 41 is also outputted from a modem 47 as well as the communication controller 42. Furthermore, the modem 47 is added to the elements, such as the CPU 41, the communication controller 42, and the memory 43, to which electric power is always supplied. The modem 47 outputs the interrupt demand signal to the CPU 41 if a call is made to the modem 47. If no message is supplied from the parent node for a predetermined time or if the CPU 41 receives the first specific message 120 from the parent node 10, the CPU 41 controls the power supply control portion 45 to cut the supply of electric power to the peripheral circuit portion 44, followed by executing the halt command, caused by stopping the operation.

The halt is cancelled in response to either of two outputted interrupt demand signals connected to the CPU 41 as shown in FIG. 10. Therefore, the halt of the CPU 41 is cancelled when the communication controller 42 detects the message from the parent node 10 or when the modem 47 detects a call. The process to be performed after the halt has been cancelled is different depending upon the state prior to the halt (that is, whether or not the halt has been effected depending upon the time lapse or whether or not the halt has been effected in response to the first specific message) and upon the interrupt demand signal which caused the halt to be cancelled.

If the halt was effected depending upon the predetermined time lapse or when the first specific message is received and the halt was cancelled when the message was received from the parent node 10, the message is received and electric power is supplied to the peripheral circuit 44. Then, the ordinary operation process is performed.

If the halt is effected when the first specific message is received and the halt is cancelled when a call is received, data from the modem 47 is received and electric power is supplied to the peripheral circuit 44 followed by issuing the second specific message. Then, the sending of the response message corresponding to the second specific message from the parent node is awaited, followed by receiving the foregoing response message and performing the ordinary operation process.

Figure 11:
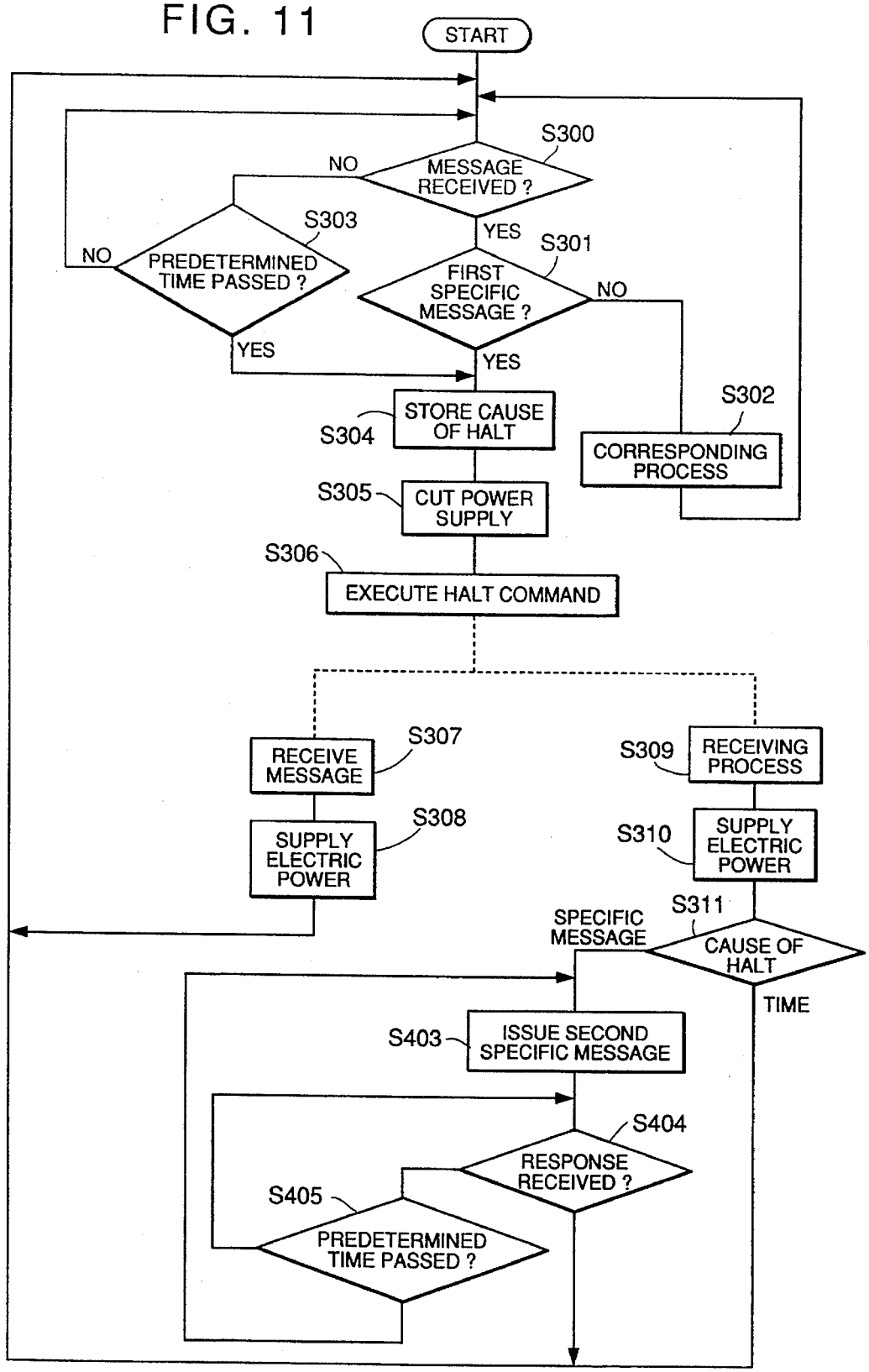
FIG. 11 is a flow chart which illustrates the second operation of the children nodes according to the second embodiment of the present invention.

The foregoing operations are expressed in the form of a flow chart shown in FIG. 11. The CPU 41 discriminates in step S300 whether or not the message has been received. If it has not been received, a discrimination is made in step S303 whether or not a predetermined time has passed from the receipt of the previous message by checking a predetermined counter region in the memory 43. If a predetermined time has not passed, the CPU 41 waits for the message supplied from the parent node in step S300. If a predetermined time has passed, the flow returns to step S304. If the message has been received in step S300, the CPU 41 discriminates in step S301 whether or not the message is the first specific message. If the message is the first specific message, the flow proceeds to step S304. If the message is a message except for the first specific message, the CPU 41 performs a process corresponding to the message in step S302 followed by returning to step S300 in which the CPU 41 waits for the next message.

In step S304, the CPU 41 stores in the memory 43 the cause of the halt due to the time or in response to the specific message. In step S305, the CPU 41 cuts the power supply to the peripheral circuit 44 and then executes the halt command in step S306, causing the operation to be stopped.

The process to be performed after the halt has been cancelled will now be described. If any message is supplied from the parent node 10 followed by detection of the message by the communication controller 42 and followed by cancelling the halt in response to the resulted output of the interrupt demand signal, the CPU 41 receives the foregoing message in step S307. The CPU 41 then causes electric power to be supplied to the peripheral circuit 44 in step S308. Then, the ordinary operation process, that is, the processes from step S300, are executed.

If a call is received by the modem 47 followed by cancelling the halt in response to the resulting output of the interrupt demand signal, the CPU 41 performs the receipt process to correspond to the foregoing call in step S309. The CPU 41 then again supplies electric power to the peripheral circuit 44 in step S310. Then, the CPU 41 discriminates whether or not the halt cancelled in step S310 is caused from the lapse of a predetermined time in step S303 or from the receipt of the first specific message 120 in step S301. If the halt was effected due to the lapse of a predetermined time stored on the memory 43 in step S304, the flow returns to step S300 in which the ordinary operation process is performed. If the halt was effected when the first specific message is received, the flow returns to step S403.

Steps S403 to S405 are arranged so that the same processes are performed as in steps 403 to 405 in FIG. 9. Therefore, the CPU 41 issues the second specific message in step S403, followed by waiting for the response message corresponding to the second specific message for a predetermined time (or a random time) in steps S404 and S405. If the response message is not received, the CPU 41 again transmits the second specific message in step S403. If it has been received, the flow returns to step S300 in which the CPU 41 continues the ordinary operation process.

As described above, according to this embodiment, if the parent node 10 has no work to be performed except for the work of waiting for data from the child node, the children nodes are shifted to the sleeping state as well as the parent node until the data is generated. Therefore, the overall communication system can be freed from the wasteful electric power consumption. Furthermore, the child node is shifted to the sleeping state if no polling/selecting operation is performed by the parent node for a long time and the sleeping state is realized. Therefore, the electric power consumption can further be reduced.

Although the bus-like communication configuration is described, the present invention is not limited to this. The present invention can be embodied in the other topology communication arrangement, such as a star-like communication arrangement, a daisy chain like communication arrangement. Furthermore, the present invention can be embodied in a half-duplex communication mode as well as the full duplex communication mode.

Although the invention has been described in its preferred form with a certain degree of particularly, it is to be understood that the present disclosure of a preferred embodiment may be changed in the details of construction, combination or arrangement of parts without departing from the spirit and the scope of the invention as hereinafter claimed.

We claim:

1. A communication system comprising a parent node and a plurality of children nodes, wherein said parent node receives messages having a predetermined format from the plurality of children nodes;

when said parent node receives a broken predetermined message from the plurality of children nodes, the parent node recognizes existence of a new child node and transmits a predetermined broadcast message to the plurality of children nodes, and the parent node sequentially transmits a specific message to each of the children nodes;

said parent node receives a response message from each of the plurality of children nodes and recognizes the state of each of the plurality of children nodes in accordance with said response message received from each child node.

2. A system according to claim 1, wherein each of the plurality of said children nodes transmits said response message containing attribute information when said specific message has been received.

3. A system according to claim 1, wherein each of the plurality of said children nodes transmits a response message when a command message supplied from said parent node has been received except when received at a starting-up moment, while each of the plurality of said children nodes transmits said response message at the starting-up moment even if said command message supplied from said parent node has not been received.

4. A method for a parent node to recognize the states of a plurality of children nodes comprising the steps of:

receiving at said parent node, messages having a predetermined format from the plurality of children nodes;

recognizing an existence of a new child node in accordance with whether the received predetermined format message is broken or not;

transmitting by the parent node a predetermined broadcast message to the plurality of said children nodes;

sequentially transmitting a specific message by the parent node to each of the plurality of said children nodes; and transmitting a response message by each child to the parent node when the specific message has been received by the child node; and recognizing the state of each of the plurality of said children nodes in accordance with the response message supplied from each of the plurality of said children nodes to the parent node corresponding to said specific message.

5. A control method for a controller of a communication system including a terminal, comprising the steps of:

distinguishing whether a received message is in a format of a response message which the terminal transmits in response to a command message from the controller;

recognizing whether the terminal is in a state of start up or in another state in accordance with the distinguishing; and performing registration processing of the terminal on recognizing that the terminal starts up.

6. A method according to claim 5, wherein said registration processing registers an identification of the terminal.

7. A method according to claim 5, wherein said recognition step recognizes that the terminal starts up when the received message is distinguished to be in a format other than the format of the response message.

8. A control method according to claim 5, further comprising a stop step of stopping communication of a terminal when recognizing that the terminal starts up in said recognizing step.

9. A control method according to claim 8, wherein said stop step stops communication of a terminal by a broadcast message.

10. A controller of a communication system including a terminal, comprising:

distinguishing means for distinguishing whether a received message is in a format of a response message which the terminal transmits in response to a command message from the controller;

recognition means for recognizing whether the terminal is in a state of start up or in another state in accordance with the distinguishing by the distinguishing means; and registration means for performing registration processing of the terminal when said recognizing means recognizes that the terminal starts up.

11. A controller according to claim 10, wherein said registration means registers an identification of the terminal.

12. A controller according to claim 10, wherein said recognition means recognizes that the terminal starts up when said distinguishing means distinguishes that the received message is in a format other than the format of the response message.

13. A controller according to claim 10, further comprising stop means for stopping communication of a terminal when said recognizing means recognizes that the terminal starts up.

14. A controller according to claim 13, wherein said stop means stops communication of a terminal by a broadcast message.

15. A control method of a communication apparatus in a communication system having a controller for recognizing whether a terminal is in a state of start up or in another state in accordance with a format of a message received from the terminal and for performing registration of the terminal when the terminal starts up, comprising steps of:

transmitting a response message to a controller of the communication system in response to a command message from the controller when the controller recognizes that the communication apparatus starts up; and transmitting a first message to the controller independently of the command message so that the controller can recognize that the communication apparatus starts up.

16. A control method according to claim 15, wherein communication is stopped when a message to stop the communication from the controller is received.

17. A controller connected with a plurality of terminals, comprising:

first receiving means for receiving a message from one of the plurality of terminals;

transmitting means for recognizing that a new terminal is connected and transmitting a specific message to the plurality of terminals when said first receiving means receives a broken message;

second receiving means for receiving response messages transmitted by the plurality of terminals in response to the specific message; and recognizing means for recognizing the new terminal based on the response messages received by said second receiving means.

18. A controller according to claim 17, wherein said transmitting means transmits the specific message to each of the plurality of terminals.

19. A controller according to claim 18, wherein said transmitting means transmits a broadcast message to the plurality of terminals before transmitting the specific message.

20. A method of recognizing a new terminal, comprising:

a first receiving step of receiving a message from one of a plurality of terminals;

a transmitting step of recognizing existence of a new terminal and transmitting a specific message to the plurality of terminals when a broken message is received in said first receiving step;

a second receiving step of receiving response messages transmitted by the plurality of terminals in response to the specific message; and a recognizing step of recognizing the new terminal based on the response messages received in said second receiving step.

21. A method according to claim 20, wherein the specific message is transmitted to each of the plurality of terminals.

22. A method according to claim 21, wherein a broadcast message is transmitted to the plurality of terminals before transmitting the specific message.

23. A terminal for a system in which a plurality of terminals are connected with a controller, comprising:

first transmitting means for transmitting a predetermined message to the controller on an operation start;

receiving means for receiving a specific message which the controller has transmitted in response to reception of a broken predetermined message; and second transmitting means for transmitting a response message for informing the controller that the terminal is in operation, based on the specific message received by said receiving means.

24. A terminal according to claim 23, wherein said receiving means receives a broadcast message and the specific message which the controller has transmitted in response to the reception of the broken predetermined message.

25. A method for informing a controller that one of a plurality of terminals connected to the controller starts an operation, comprising:

a first transmitting step of transmitting a predetermined message from the one of the plurality of terminals to the controller on an operation start;

a receiving step of receiving at the plurality of terminals a specific message transmitted by the controller in response to reception of a broken predetermined message; and a second transmitting step of transmitting a response message from the one of the plurality of terminals to the controller for informing the controller that the one of the plurality of terminals is in operation.

26. A method according to claim 25, wherein a broadcast message and the specific message are transmitted by the controller to the one of the plurality of terminals in response to the reception of the broken predetermined message.

27. A communication system comprising:

a controller and a terminal;

the controller including:

distinguishing means for distinguishing whether a received message is in a format of a response message which the terminal transmits in response to a command message from the controller;

recognizing means for recognizing whether the terminal is in a state of start up or in another state in accordance with distinguishing by said distinguishing means; and registration means for performing registration processing when said recognizing means recognizes that the terminal starts up;

the terminal including:

transmitting means for transmitting a first message independently of the command message; and response means for transmitting the response message to the controller in response to the command message.

28. A system according to claim 27, wherein said registration means registers an identification of the terminal.

29. A system according to claim 27, wherein said recognizing means recognizes that the terminal starts up when said distinguishing means distinguishes that the received message is in a format other than that of the response message.

30. A system according to claim 27, wherein the controller includes stop means for stopping communication of a terminal when said recognizing means recognizes that the terminal starts up.

31. A system according to claim 30, wherein said stop means stops communication of a terminal by a broadcast message.

32. A communication apparatus comprising:

a parent node;

a plurality of children nodes;

said parent node including:

means for receiving messages having a predetermined format from the plurality of children nodes, means for recognizing existence of a new child node and transmitting a predetermined broadcast message to the plurality of children nodes when receiving a broken predetermined message from the plurality of children nodes, means for sequentially transmitting a specific message to each of the plurality of children nodes following said broadcast message, and means for receiving response messages to the specific message from the children nodes; and each of said plurality of children nodes including means for transmitting the response message to the parent node when the specific message has been received by the child node, wherein said parent node receives the response messages from the children nodes and recognizes the state of each of the plurality of children nodes according to the response message therefrom.

33. A communication apparatus in a communication system having a controller for recognizing whether a terminal is in a state of start up or in another state in accordance with a format of a message received from the terminal and for performing registration of the terminal when the terminal starts up, comprising:

response means for transmitting a response message to a controller of the communication system in response to a command message from the controller when the controller recognizes that the communication apparatus starts up; and transmission means for transmitting a first message to the controller independently of the command message so that the controller can recognize that the communication apparatus starts up.

34. A communication apparatus according to claim 30, wherein a communication apparatus includes stop means for stopping communication when receiving a message to stop the communication from the controller.

* * * * *

UNITED STATES PATENT AND TRADEMARK OFFICE
CERTIFICATE OF CORRECTION

PATENT NO. : 5,598,150
DATED : January 28, 1997
INVENTOR(S) : Noriyuki SUZUKI, et al.

It is certified that error appears in the above-indentified patent and that said Letters Patent is hereby corrected as shown below:

On drawing sheet,

In FIGURE 9,

Element 401, "OENERATED" should read --GENERATED--

COLUMN 2

Line 34, "be" should be deleted.

COLUMN 4

Line 46, "in" should be deleted.

COLUMN 8

Line 50, "that" should be deleted;

Line 60, "difference" should read --different--.

UNITED STATES PATENT AND TRADEMARK OFFICE
CERTIFICATE OF CORRECTION

PATENT NO. : 5,598,150
DATED : January 28, 1997
INVENTOR(S) : Noriyuki SUZUKI, et al.

It is certified that error appears in the above-indentified patent and that said Letters Patent is hereby corrected as shown below:

COLUMN 12

Line 9, "chain like" should read --chain-like--;

Line 14, "particularly," should read --particularity,--.

Signed and Sealed this

Fifteenth Day of July, 1997

Attest:

BRUCE LEHMAN

Attesting Officer

Commissioner of Patents and Trademarks